(12) United States Patent
Todeschini

(10) Patent No.: US 11,870,520 B2
(45) Date of Patent: Jan. 9, 2024

(54) METHOD, DEVICE AND SYSTEM FOR SELECTING AN ANTENNA

(71) Applicant: SAFRAN ELECTRONICS & DEFENSE, Paris (FR)

(72) Inventor: Eric Todeschini, Paris (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 46 days.

(21) Appl. No.: 17/786,592

(22) PCT Filed: Dec. 18, 2020

(86) PCT No.: PCT/EP2020/086979
§ 371 (c)(1),
(2) Date: Jun. 17, 2022

(87) PCT Pub. No.: WO2021/123132
PCT Pub. Date: Jun. 24, 2021

(65) Prior Publication Data
US 2023/0010552 A1 Jan. 12, 2023

(30) Foreign Application Priority Data
Dec. 20, 2019 (FR) ...................................... 1915184

(51) Int. Cl.
*H04B 7/02* (2018.01)
*H04B 7/06* (2006.01)
*H04B 7/0491* (2017.01)

(52) U.S. Cl.
CPC ........... *H04B 7/061* (2013.01); *H04B 7/0491* (2013.01)

(58) Field of Classification Search
CPC ............................. H04B 7/061; H04B 7/0491

USPC ........ 375/267, 262, 260, 259, 219, 295, 316
See application file for complete search history.

(56) References Cited

U.S. PATENT DOCUMENTS

| 2005/0063343 | A1 | 3/2005 | Hoffmann et al. |
| 2005/0285784 | A1 | 12/2005 | Chiang et al. |
| 2015/0236778 | A1* | 8/2015 | Jalali .................. H04B 7/18528 370/316 |

FOREIGN PATENT DOCUMENTS

| JP | H11-122152 A | 4/1999 |
| WO | 2018/055179 A1 | 3/2018 |

OTHER PUBLICATIONS

Feb. 8, 2021 International Search Report issued in International Patent Application No. PCT/EP2020/086979.

* cited by examiner

*Primary Examiner* — Zewdu A Kassa
(74) *Attorney, Agent, or Firm* — Williams Mullen; R. Brian Drozd

(57) ABSTRACT

An antenna in a system is provided and includes a first device and at least one second mobile device, where the first device communicates with the second device(s). In an acquisition mode, for each antenna of an antenna system, a first item of communication quality information is obtained, and the antenna the first item of information of which is the highest is selected. In a pursuit mode, if the selected antenna is sectoral, a second item of communication quality information is obtained, and the antenna the second item of information of which is the highest is selected. For each antenna, a third item of communication quality is obtained if the selected antenna is the omnidirectional antenna, and from the third items of information, the antenna the third item of information of which is the highest is selected.

8 Claims, 6 Drawing Sheets

METHOD, DEVICE AND SYSTEM FOR SELECTING AN ANTENNA

TECHNICAL FIELD

The invention relates to a method, a device and a system for selecting an antenna.

PRIOR ART

Preserving human beings has become a major preoccupation in many fields. Thus, in many perilous missions, human beings are replaced by pilotless mobile devices.

Mention can be made for example of certain observation missions over dangerous zones such as conflict zones, construction sites at a height, or nuclear sites, implemented by pilotless airborne devices known as drones, or running, floating or submersible devices.

Although some pilotless mobile devices are entirely automatic, many of these devices are remotely controlled by one or more human beings from a command station. These pilotless mobile devices must generally transmit observation results either to a person who is controlling them, or to a person responsible for analysing the data resulting from these observations. These data frequently comprise images and sometimes videos. It is then necessary to establish wireless communications between the pilotless mobile devices and the command station to provide remote control of the devices and transmission of the observation data. Such communications must be as reliable as possible in order firstly for a loss of control not to cause the loss of a pilotless mobile device, which may have a very high cost, and secondly so that the observation data are as usable as possible.

In order to make the communications between the command station and a pilotless mobile device reliable, the command station and said mobile device may be equipped with a plurality of antennas. In order to increase the gain and the range of these antennas, it is usual to use directional antennas each covering a predefined sector in the vicinity of the plurality of antennas. All the predefined sectors form a range zone around the plurality of antennas. When the pilotless mobile device is a drone, the range zone of a command station may for example take the form of a half-sphere around the plurality of antennas of the command station, whereas the range zone of the drone may take the form of a sphere around the plurality of antennas of the drone.

By definition, a pilotless mobile device moves around the command station. Consequently, said mobile device passes successively from one predefined sector to another. Since each antenna in the plurality of antennas addresses a predefined sector, it is necessary to determine which antennas to use to establish the best possible communication between the command station and said mobile device. It is desirable to use a method for selecting an antenna that is sufficiently reactive for there to be no break in communication between the command station and the mobile device when passing from one predetermined sector to another or when a mobile device appears in the range zone of the command station or when a break in the connection between the mobile device and the command station appears.

The patent application WO 2018/055179 filed by the applicant discloses a method for selecting an antenna. The method as disclosed does not allow a continuous and interruption-free monitoring of the movement of the device.

DISCLOSURE OF THE INVENTION

The present invention aims to improve the monitoring of a mobile device by quickly and reliably selecting the antenna for exchanging data between a first device and a second mobile device.

According to a first aspect of the present invention, the present invention relates to a method for selecting an antenna in a system comprising a first device and at least one second mobile device, the system forming a communication network wherein the first device communicates the at least one second device using a media-access technique of the time division multiple access type wherein each communication takes place in frames, each frame being divided into a plurality of timeslots comprising a first timeslot enabling the first device to send a first signal to the second device and enabling the second device to synchronise timewise on a time reference of the first device, and a second timeslot enabling the second device to send a second signal in response to the first signal to acknowledge its presence in the system, the first device sending and receiving the signals by means of an antenna system comprising at least a number N of sector antennas with N greater than or equal to four and an omnidirectional antenna, characterised in that the method comprises the steps performed by the first device of:

obtaining, in an acquisition mode, for each antenna in the antenna system, a first item of information representing a quality of communication between the antenna and the second device;

selecting, from the obtained first items of information representing a communication quality, the antenna the first item of information of which representing the communication quality is the highest, to transmit and/or receive data with the mobile device, obtaining, in a so-called pursuit mode, if the selected antenna is a sectoral antenna, for the unidirectional antenna and for each antenna in a group of M sectoral antennas comprising the selected sectoral antenna, with M strictly less than N, a second item of information representing a quality of communication between the antenna and the second device;

selecting, from the obtained second items of information representing a communication quality, the antenna the second item of information of which representing the communication quality is the highest, to transmit and/or receive data with the mobile device;

obtaining, in the so-called pursuit mode, each antenna of the antenna system, a third item of information representing a quality of communication between the antenna and the second device if the selected antenna is the omnidirectional antenna;

selecting, from the obtained third items of information representing a communication quality, the antenna the third item of information of which representing the communication quality is the highest, to transmit and/or receive data with the mobile device.

The invention also relates to a device for selecting an antenna in a system comprising a first device and at least one second mobile device, the system forming a communication network wherein the first device communicates the at least one second device using a media-access technique of the time distribution multiple access type wherein each communication takes place in frames, each frame being divided into a plurality of timeslots comprising a first timeslot enabling the first device to send a first signal to the second device and enabling the second device to synchronise timewise on a time reference of the first device, and a second timeslot enabling the second device to send a second signal in response to the first signal to acknowledge its presence in the system, the first device sending and receiving the signals by means of an antenna system comprising at least a number N of sector antennas with N greater than or equal to four and an omnidirectional antenna, characterised in that the selection device is included in the first device and comprises:

means for obtaining, in an acquisition mode, for each antenna in the antenna system, a first item of information representing a quality of communication between the antenna and the second device;

means for selecting, from the obtained first items of information representing a communication quality, the antenna the first item of information of which representing the communication quality is the highest, to transmit and/or receive data with the mobile device, means for obtaining, in a so-called pursuit mode, if the selected antenna is a sectoral antenna, for the unidirectional antenna and for each antenna in a group of M sectoral antennas comprising the selected sectoral antenna, with M strictly less than N, a second item of information representing a quality of communication between the antenna and the second device;

means for selecting, from the obtained second items of information representing a communication quality, the antenna the second item of information of which representing the communication quality is the highest, to transmit and/or receive data with the mobile device;

means for obtaining, in the so-called pursuit mode, each antenna of the antenna system, a third item of information representing a quality of communication between the antenna and the second device if the selected antenna is the omnidirectional antenna;

means for selecting, from the obtained third items of information representing a communication quality, the antenna the third item of information of which representing the communication quality is the highest, to transmit and/or receive data with the mobile device.

The invention also relates to a system for selecting an antenna comprising a first device and at least one second mobile device, the system forming a communication network wherein the first device (10) communicates the at least one second device using a media-access technique of the time division multiple access type wherein each communication takes place in frames, each frame being divided into a plurality of timeslots comprising a first timeslot enabling the first device to send a first signal to the second device and enabling the second device to synchronise timewise on a time reference of the first device, and a second timeslot enabling the second device to send a second signal in response to the first signal to acknowledge its presence in the system, the first device sending and receiving the signals by means of an antenna system comprising at least a number N of sector antennas with N greater than or equal to four and an omnidirectional antenna, characterised in that the system comprises:

means, included in the first device, for obtaining, in an acquisition mode, for each antenna in the antenna system, a first item of information representing a quality of communication between the antenna and the second device;

means, included in the first device, for selecting, from the obtained first items of information representing a communication quality, the antenna the first item of information of which representing the communication quality is the highest, for transmitting and/or receiving data with the mobile device;

means, included in the first device, for obtaining, in a so-called pursuit mode, if the selected antenna is a sector antenna, for the omnidirectional antenna and for each antenna in a group of M sector antennas comprising the selected sector antenna, with M strictly less than N, a second item of information representing a quality of communication between the antenna and the second device;

means, included in the first device, for selecting, from the obtained second items of information representing a communication quality, the antenna the second item of information of which representing the quality of communication is the highest, for transmitting and/or receiving data with the mobile device;

means, included in the first device, for obtaining, in the so-called pursuit mode, for each antenna in the antenna system, a third item of information representing a quality of communication between the antenna and the second device if the selected antenna is the omnidirectional antenna;

means, included in the first device, for selecting, from the obtained third items of information representing a communication quality, the antenna the third item of information of which representing the quality of communication is the highest, for transmitting and/or receiving data with the mobile device;

two reception channels, included in the first device, the omnidirectional antenna being connected alternately to one or other of the reception channels;

two reception channels, included in the second device.

Thus the present invention improves the monitoring of a mobile device by quickly and reliably selecting the antenna for exchanging data between a first device and a second mobile device.

According to one embodiment, the first device:

checks whether the first item of information representing the highest communication quality is below a predetermined threshold, and the first device remains in the acquisition mode as long as the first item of information representing the highest communication quality is below a predetermined threshold.

According to one embodiment, the first device:

checks whether the second or the third item of information representing the highest communication quality is below a predetermined threshold, and the first device goes into the acquisition mode if the second item of information representing the highest communication quality is below the predetermined threshold.

According to one embodiment, N is equal to six, M is equal to three and the group of antennas comprises the sector antennas adjacent to the sector antenna selected.

According to one embodiment, the first device comprises two reception channels and the omnidirectional antenna is connected alternately to one or other of the reception channels.

The invention also relates to a computer program, characterised in that it comprises instructions for implementing, by a device, the method according to the first aspect, when said program is executed by a processor of said device.

The invention also relates to storage means, characterised in that they store a computer program comprising instructions for implementing, by a device, the method according to the first aspect when said program is executed by a processor of said device.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

The invention is described hereinafter in a context of a system comprising a command station and a mobile device. The present invention is of course also applicable in the case where the command station communicates with a plurality of mobile devices.

The command station comprises an antenna system comprising a plurality of antennas each addressing a predefined sector and the mobile device comprises two antennas. Naturally, the present invention is also applicable when the mobile device comprises only one antenna.

Figure 1:
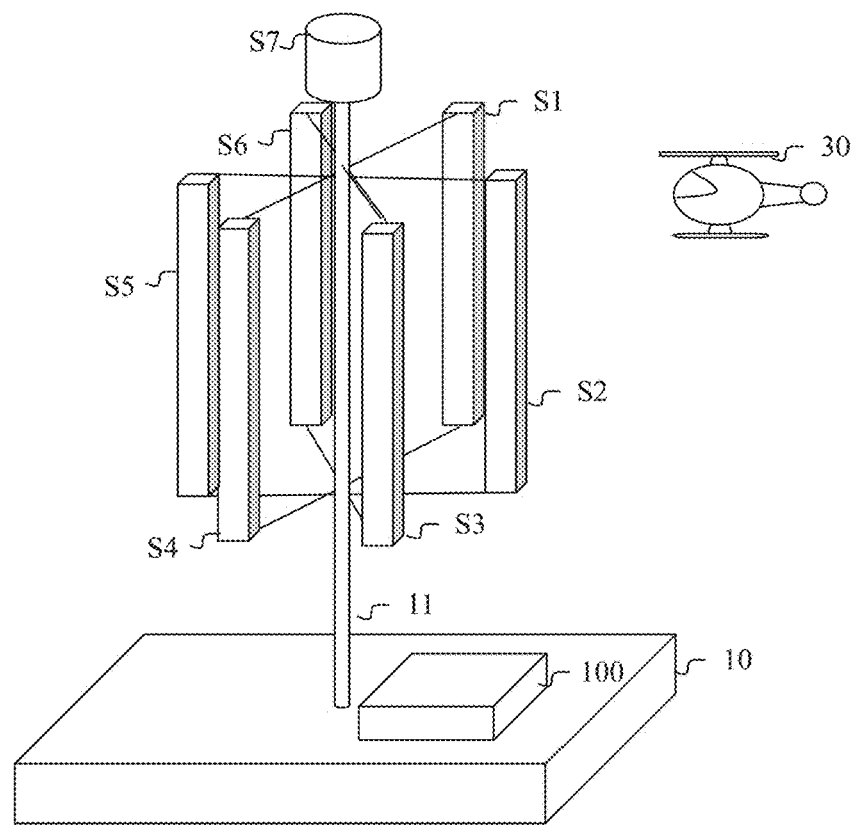
FIG. 1 illustrates schematically a system according to the invention.

FIG. 1 illustrates schematically an example of a system according to the invention.

In the example in FIG. 1, a system 1 comprises a command station 10 for simultaneously controlling a mobile device 30 such as a drone.

The command station 10 comprises an antenna system 11 comprising a plurality of antennas. The command station 10 comprises a processing module 100 able to implement the method according to the invention. In the example in FIG. 1, the antenna system 11 comprises six sector antennas S1, S2, S3, S4, S5 and S6 and one omnidirectional antenna S7. Each sector antenna makes it possible to cover at "−3 dB" an azimuth of "60°" and an elevation of "+12.5°". The omnidirectional antenna 12 makes it possible to cover at "−3 dB" an azimuth of "360°" and "+90°" in elevation. The omnidirectional antenna S7 serves at a short distance for passages of the mobile device 30 above the antenna system 11 of the command station 10. The mobile device 30 comprises an antenna system (not shown) comprising two omnidirectional antennas (not shown).

The system 1 described in relation to FIG. 1 forms a communication network wherein the command station 10 communicates with the mobile device 30. The command station 10 and the mobile device 30 exchange in particular control data in the direction from command station 10 to the mobile device 30 and observation data in the direction from mobile device 30 to the command station 10.

In the system 1, the command station 10 and the mobile device 30 use a media-access technique of the time distribution multiple access (TDMA) type wherein each data communication takes place in one or more frames. This media-access technique requires time synchronisation at each node in the communication network (i.e. at the command station 10 and at the mobile device 30) to avoid any time overlap. The communication network in FIG. 1 uses a centralised topology wherein the command station 10 acts as a master node, i.e. the command station 10 times the whole of the network. The mobile device 30 is a slave of the master node and adjusts itself timewise to a time reference given by the master node.

Figure 2:
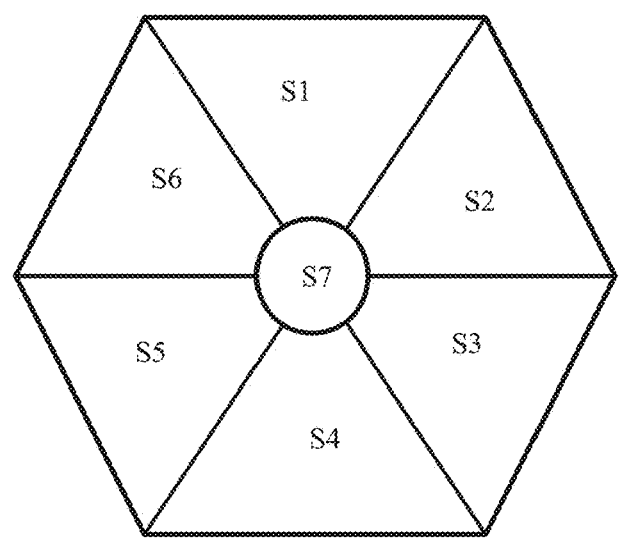
FIG. 2 illustrates schematically the distribution of the antennas in one plane.

FIG. 2 illustrates schematically the distribution of the antennas in one plane.

In the example in FIG. 2, the antennas S6, S2 and S7 are adjacent to the antenna S1, the antennas S1, S3 and S7 are adjacent to the antenna S2, the antennas S2, S4 and S7 are adjacent to the antenna S3, the antennas S3, S5 and S7 are adjacent to the antenna S4, the antennas S4, S6 and S7 are adjacent to the antenna S5, the antennas S5, S1 and S7 are adjacent to the antenna S6 and the antennas S1 to S6 are adjacent to the antenna S7.

Antennas are adjacent when their respective sectors are adjacent.

Figure 3:
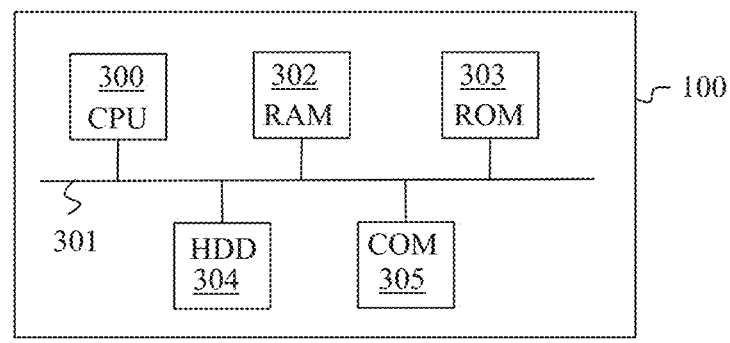
FIG. 3 illustrates schematically a processing module included in a command station.

FIG. 3 illustrates schematically a processing module included in a command station.

According to the example of hardware architecture shown in FIG. 3, the processing module 10 then comprises, connected by a communication bus 301: a processor or CPU (central processing unit) 300; a random access memory RAM 302; a read only memory ROM 303; a storage unit such as a hard disk or a storage medium reader, such as an SD (Secure Digital) card reader 304; at least one communication interface 305 enabling the processing module 100 to communicate with other modules or devices. For example, the communication interface 305 enables the processing module 100 to communicate with other modules of the command station 10 such as an antenna switching module making it possible to select an antenna to be used at a given instant or with the mobile device 30. The communication interface will be described in detail with reference to FIG. 5. The processor 300 is capable of executing instructions loaded in the RAM 302 from the ROM 303, from an external memory (not shown), from a storage medium (such as an SD card), or from a communication network. When the command module 100 is powered up, the processor 300 is capable of reading instructions from the RAM 302 and executing them. In one embodiment, these instructions form a computer program causing the complete or partial implementation, by the processor 300, of the method described below in relation to FIGS. 8, 9 and 10. The methods described in relation to FIGS. 8, 9 and 10 can be implemented in software form by executing a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

Figure 4:
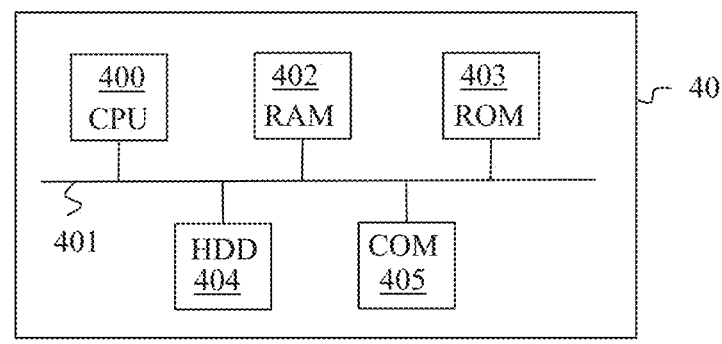
FIG. 4 illustrates schematically a processing module included in a mobile device.

FIG. 4 illustrates schematically a processing module included in a mobile device. According to the example of hardware architecture shown in FIG. 4, the processing module 40 comprises, connected by a communication bus 401: a processor or CPU (central processing unit) 400; a random access memory RAM 402; a read only memory ROM 403; a storage unit such as a hard disk or a storage medium reader, such as an SD (Secure Digital) card reader 404; at least one communication interface 405 enabling the processing module 40 to communicate with other modules or devices. For example, the communication interface 405 enables the processing module 40 to communicate with other modules such as an antenna switching module making it possible to select an antenna to be used at a given instant or with the command station 10.

The processor 400 is capable of executing instructions loaded in the RAM 402 from the ROM 402, from an external memory (not shown), from a storage medium (such as an SD card), or from a communication network. When a mobile device 30 is powered up, the processor 400 is capable of reading instructions from the RAM 3002 and executing them.

Figure 5:
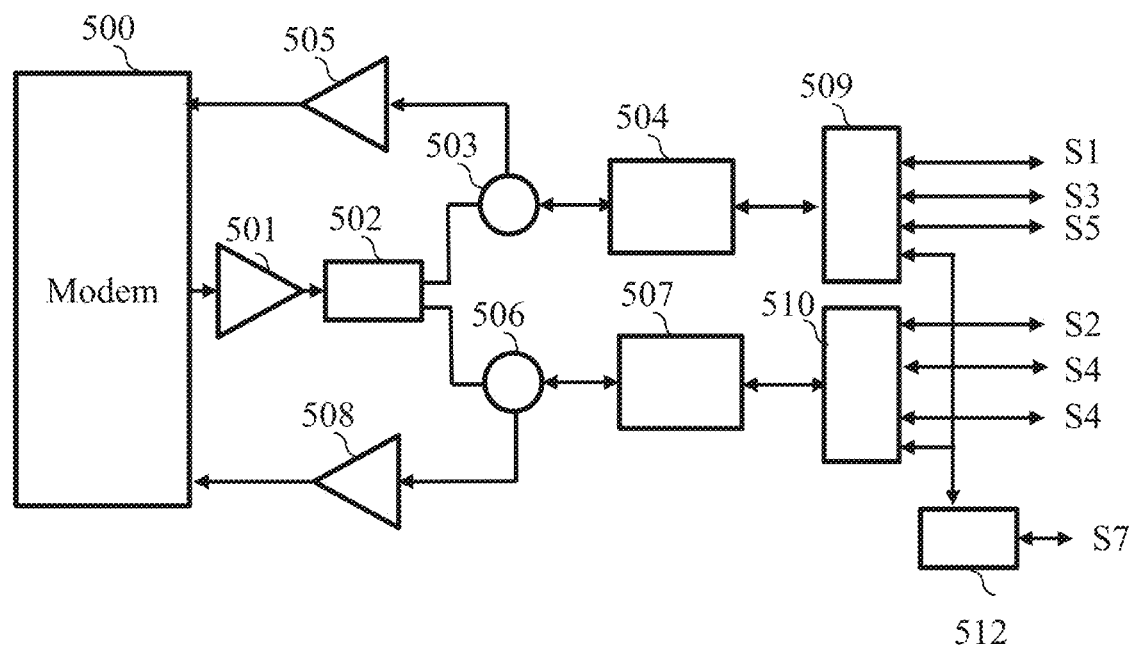
FIG. 5 illustrates schematically a block diagram of the communication interface of the command station.

FIG. 5 illustrates schematically a block diagram of the communication interface of the command station.

The communication interface 305 comprises a modem 500, amplifiers 501, 505 and 508, switches 502 ad 512, circulators 503 and 506, filters 504 and 507 and RF switches 509 and 510.

The transmission channel of the modem 500 is amplified by the amplifier 501. The output of the amplifier 501 is connected to the switch 502. A first output of the switch 502 is connected to a first input/output of the circulator 503 and a second output of the switch 502 is connected to a first input/output of the circulator 506.

A second input/output of the circulator 503 is connected to an amplifier 505 the output of which is connected to a first reception channel of the modem 500.

A third input/output of the circulator 503 is connected to the radio-frequency filter 504, the output of which is connected to the RF switch 509.

The switch 509 makes it possible to select, from the odd sector antennas S1, S3, S5 and the omnidirectional antenna S7 the antenna used for the transmission and/or reception of frames and/or to select the antenna on which RSSI (received signal strength indication) measurements are made.

A second input/output of the circulator 506 is connected to an amplifier 508, the output of which is connected to a second reception channel of the modem 500.

A third input/output of the circulator 506 is connected to the radio-frequency filter 507, the output of which is connected to the switch 510.

The switch 510 makes it possible to select, among the even sector antennas S2, S4 and S6 and the omnidirectional antenna S7, the antenna used for the transmission and/or reception of frames and/or to select the antenna on which RSSI (received signal strength indication) measurements are made.

The switch 512 is connected to the omnidirectional antenna S7 and makes it possible to connect the omnidirectional antenna S7 either to the switch 509 or to the switch 510.

Thus the communication interface 305 has a transmission channel that can use any one of the antennas S1 to S7 and has two simultaneous reception channels.

The two reception channels make it possible to make two different RSSI measurements in the same timeslot in a particular embodiment, to combine the data received by the two channels to improve the quality of reception of the data.

Figure 6:
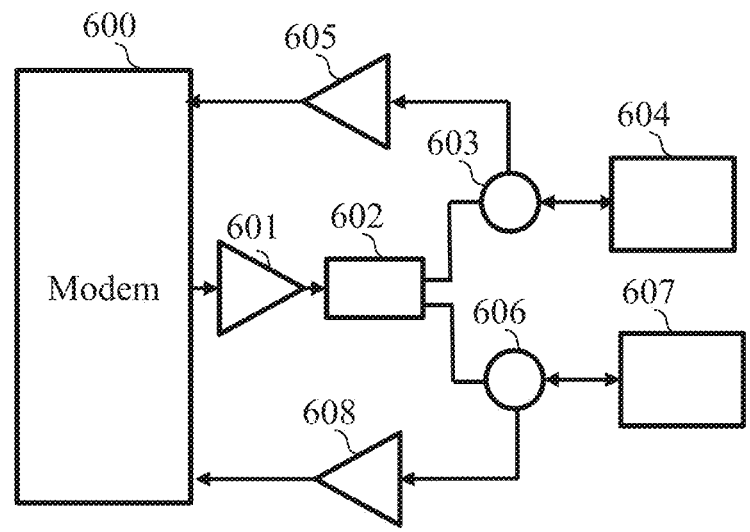
FIG. 6 illustrates schematically a block diagram of the communication interface included in the mobile device.

FIG. 6 illustrates schematically a block diagram of the communication interface of the mobile device.

The communication interface 405 comprises a modem 600, amplifiers 601, 605 and 608, a switch 602, circulators 603 and 606 and filters 604 and 607.

The transmission channel of the modem 600 is amplified by the amplifier 601. The output of the amplifier 601 is connected to the switch 602. A first output of the switch 602 is connected to a first input/output circulator 603 and a second output of the switch 602 is connected to a first input/output of the circulator 606.

A second input/output of the circulator 603 is connected to an amplifier 605, the output of which is connected to a first reception channel of the modem 600.

A third input/output of the circulator 603 is connected to the radio-frequency filter 604, the output of which is connected to a first antenna, not shown.

A second input/output of the circulator 606 is connected to an amplifier 608, the output of which is connected to a second reception channel of the modem 600.

A third input/output of the circulator 606 is connected to the radio-frequency filter 607, the output of which is connected to a second antenna, not shown.

Thus the communication interface 405 has a transmission channel that can use one antenna from two and has two simultaneous reception channels.

The two reception channels make it possible to combine data received by the two channels to improve the reception quality of the data.

Figure 7:
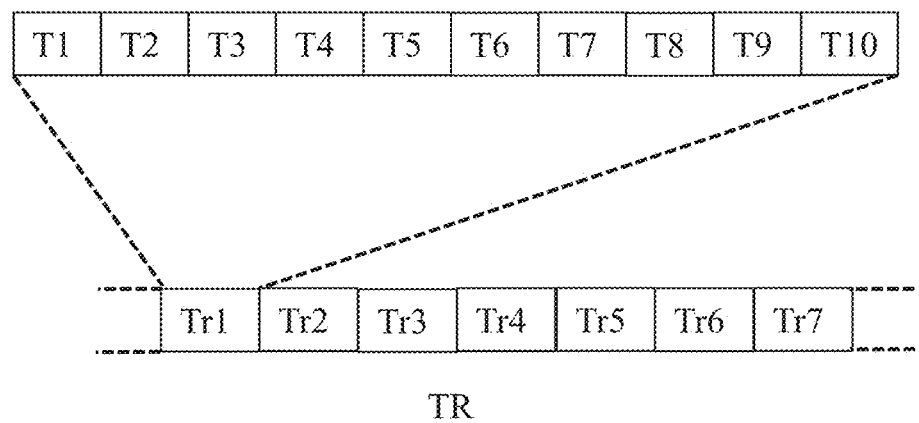
FIG. 7 illustrates schematically a frame according to the present invention.

FIG. 7 illustrates schematically an organisation of frames according to the invention.

The frames used in the system are organised in a succession of groups of consecutive frames. A single group of frames is shown in FIG. 7. The group of frames comprises a number of frames equal to the number of antennas in the antenna system 11 of the command station, seven in the present example embodiment, multiplied by the number of mobile devices present in the system. The group of frames comprises the frames denoted Tr1 to Tr7.

FIG. 7 gives a detail of the frame Tr1 included in the group of frames, all the frames used in the system having an identical frame structure. The frame Tr1 is divided into a plurality of timeslots T1 to T10. The plurality of timeslots comprises a first timeslot T1 enabling the command station to transmit a first signal called a beacon and enabling each mobile device 30 to synchronise on a time reference given by the command station 10. It is by means of this beacon that the mobile device or devices can synchronise themselves.

The plurality of timeslots also comprises a second timeslot T2 enabling the mobile device to transmit a second signal thus enabling it to acknowledge its presence. The timeslots T1 and T2 are followed by a succession of timeslots. Each of the timeslots in the succession of timeslots enables a predetermined mobile device to transmit data in the direction of the command station 10 or to receive data coming from the command station 10. Each device and the command station 10 share information describing an allocation of timeslots in a frame. The information describing the allocation takes the form of an allocation table shared by all the nodes in the network. This allocation table may be fixed or be updated synchronously in all the nodes in the network.

Thus each mobile device 30 knows in which timeslot of a frame it must transmit in the direction of the command station 10 and in which timeslot of a frame it can receive data coming from the command station 10. Likewise, the command station knows in which timeslot of a frame it can transmit data in the direction of a given mobile device and in which timeslot of a frame it can receive data coming from the given mobile device. For example, in FIG. 7, when the mobile device 30 is detected by the command station, the timeslot T3 is allocated to the mobile device for transmitting data and the timeslot T4 is allocated to the mobile device 30 for receiving data.

Figure 8:
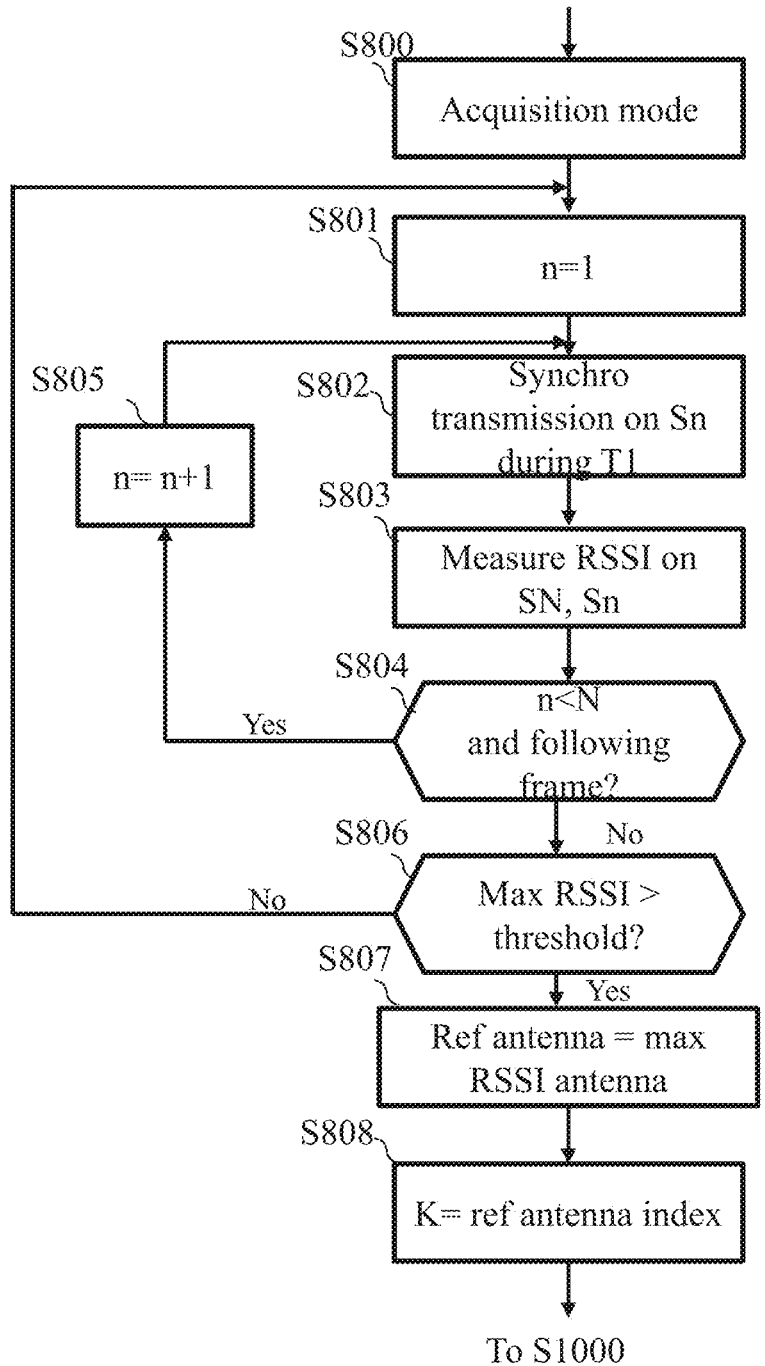
FIG. 8 illustrates schematically a method for selecting an antenna used by the command station in a so-called acquisition mode according to the present invention.

FIG. 8 illustrates schematically a method for selecting an antenna implemented by a command station in a so-called acquisition mode according to the present invention.

The method described in relation to FIG. 8 is implemented by the processing module 100. This method is a synchronous method since it follows the rhythm of the frames of the system given by the command station 10. For a group of frames, referred to as the current group of frames, the method unfolds as described below. The method is for example implemented periodically when no device is detected in one of the sectors of the antennas S1 to S7 or when it is wished to attempt to determine whether another mobile device appears in one of the sectors of the antennas S1 to S7.

Each mobile device 30 declared in the timeslot allocation table has two states: Acquisition or Pursuit. The acquisition and pursuit algorithms therefore apply for each of the mobile devices 30 and independently of each other.

At the step S800, the processing module 100 goes into a so-called acquisition mode. The acquisition mode is used for discovering a mobile device that appears in one of the sectors of the six sector antennas S1, S2, S3, S4, S5 and S6 and of the omnidirectional antenna S7 or for attempting to re-establish a communication with a mobile device 30 that has not responded or made an acknowledgement in a timeslot.

At the step S801, the processing module 100 initialises a variable n to the value 1. The variable n varies from 1 to N, where N is the number of antennas in the antenna system 11. N is greater than or equal to four, for example N is equal to 7. At the following step S802, the processing module 100 demands the transmission of a synchronisation signal during a timeslot, for example T1, of a frame. The synchronisation signal is transmitted by the antenna Sn.

At the following step S803, the processing module obtains information representing the quality of transmission during the timeslot T2, such as a measurement of RSSI, between any mobile device 30 and the antenna Sn and information representing the quality of transmission, such as a measurement of RSSI, between any mobile device 30 and the antenna Sn. The measurement of RSSI is for example made throughout the timeslot T2. Each of the two items of information representing the quality of transmission is stored in association with information representing the antenna from which the information was obtained. According to the present invention, the omnidirectional antenna S7 can be used in transmission and/or in reception by virtue of the possibility offered by the switch 512 to connect it to the switch 509 or 510.

Thus it is possible to use the two reception channels to simultaneously determine the two items of information representing the quality of transmission in one and the same timeslot.

At the following step S804, the processing module 100 checks whether the variable n is less than the number N and whether the total time corresponding to a frame has elapsed.

If so, the processing module 100 passes to the step S805. If not, the processing module 100 passes to the step S806.

At the step S805, the processing module 100 increments the variable n by one unit and returns to the step S802.

It should be noted here that the omnidirectional antenna is, when the variable n is odd, connected to the switch 501 and, when the variable n is even, connected to the switch 509.

At the step S806, the processing module 100 checks whether the information representing the quality of transmission that is the most important among the items of information representing the quality of transmission is above a predetermined threshold. This predetermined threshold is defined as minimum reception threshold.

If so, the processing module 100 passes to the step S807. If not, the processing module 100 returns to the step S801.

At the step S807, the processing module 100 selects the antenna for which the information representing the quality of transmission is the most important and, at the step S808, allocates the index of the selected antenna to a variable K. This antenna is thus considered to be a reference antenna.

Once this operation has been performed, the processing module 100 interrupts the present algorithm to initiate the implementation of the algorithm described with reference to FIG. 10.

Thus N frames are necessary for implementing the present algorithm.

Figure 9:
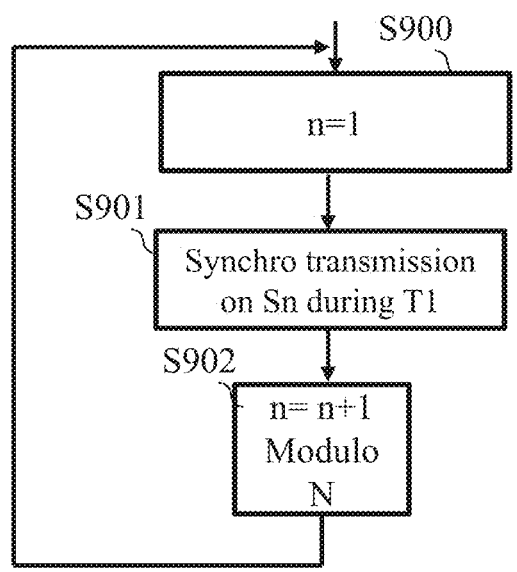
FIG. 9 illustrates schematically a method for generating a synchronisation signal used by a command station according to the present invention.

FIG. 9 illustrates schematically a method for generating a synchronisation signal used by a command station according to the present invention.

The present algorithm is implemented continuously whatever the acquisition or pursuit mode in parallel with the algorithm as described with reference to FIG. 8 and the algorithm that will be described with reference to FIG. 10.

At the step S900, the processing module 100 sets the variable n to the value 1.

At the following step S901, the processing module 100 demands the transmission of a synchronisation signal during a timeslot T1 of a frame. The synchronisation signal is transmitted by the antenna Sn.

At the following step S902, the processing module 100 increments the value of the variable n by one unit modulo N.

At the end of the frame, the processing module returns to the step S900.

Figure 10:
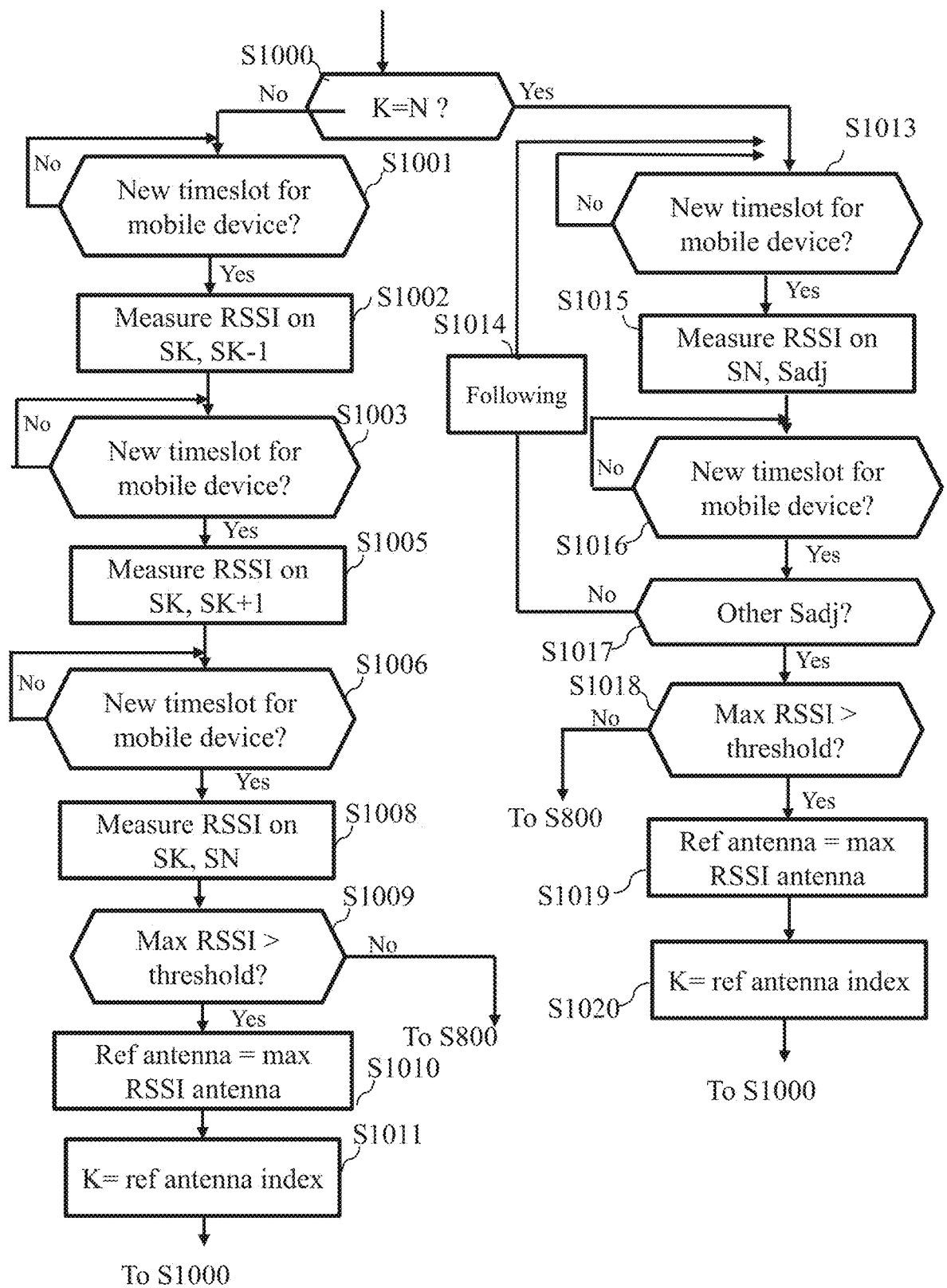
FIG. 10 illustrates schematically a method for selecting an antenna used by a command station in a so-called pursuit mode according to the present invention.

FIG. 10 illustrates schematically a method for selecting an antenna used by a command station in a so-called pursuit mode according to the present invention. The method as described in FIG. 10 is implemented following the step S808 of FIG. 8.

At the step S1000, the processing module 100 checks whether the variable K is at the value N, representing the index of the omnidirectional antenna S7.

If not, the case corresponding to a sector antenna, the processing module 100 passes to the step S1001. If so, the processing module 100 passes to the step S1013.

At the step S1001, the processing module 100 awaits the start of a new timeslot allocated in reception to the mobile device.

At the following step S1002, the processing module 100 obtains, during the timeslot allocated to the mobile device, information representing the quality of transmission, such as a measurement of RSSI, between the mobile device 30 and the antenna SK and, in the same timeslot allocated to the mobile device, information representing the quality of transmission, such as a measurement of RSSI, between the mobile device 30 and the antenna SK-1. The measurement of RSSI is made throughout the timeslot allocated to the mobile device 30 for transmitting data.

At the following step S1003, the processing module 100 awaits the start of a new timeslot allocated in reception to the mobile device.

At the start of a new timeslot allocated in reception for the mobile device, the processing module 100 passes to the step S1005.

At the following step S1005, the processing module 100 obtains, during the timeslot allocated to the mobile device, information representing the quality of transmission, such as a measurement of RSSI, between the mobile device 30 and the antenna SK and, in the same timeslot allocated to the mobile device, information representing the quality of transmission, such as a measurement of RSSI, between the mobile device 30 and the antenna SK+1. The measurement of RSSI is made throughout the timeslot allocated to the mobile device 30 for transmitting data.

At the following step S1006, the processing module 100 awaits the start of a new timeslot allocated in reception to the mobile device.

At the start of a new timeslot allocated in reception to the mobile device, the processing module 100 passes to the step S1008.

At the following step S1008, the processing module 100 obtains, during the timeslot allocated to the mobile device, information representing the quality of transmission, such as a measurement of RSSI, between the mobile device 30 and the antenna SK and, in the same timeslot allocated to the mobile device, information representing the quality of transmission, such as a measurement of RSSI, between the mobile device 30 and the antenna Sn. The measurement of RSSI is made throughout the timeslot allocated to the mobile device 30 for transmitting data.

At the step S1009, the processing module 100 checks whether the information representing the quality of transmission obtained that is the most important among the items of information representing the quality of transmission obtained is above a predetermined threshold. This predetermined threshold is defined as the minimum reception threshold.

If so, the processing module 100 passes to the step S1010. If not, the processing module 100 interrupts the present algorithm and returns to the step S800 of FIG. 8 in the acquisition mode.

At the step S1010, the processing module 100 selects the antenna for which the information representing the quality of transmission is the most important and, at the step S1011, allocates to the variable K the index of the selected antenna. This antenna is thus considered to be a reference antenna.

Once this operation has been performed, the processing module 100 returns to the step S1000.

Thus only three frames are necessary in the pursuit mode when the antenna selected is a sector antenna.

At the step S1013, the case corresponding to the omnidirectional antenna, the processing module 100 awaits the start of a new timeslot allocated in reception to the mobile device.

At the following step S1015, the processing module 100 obtains, during the timeslot allocated to the mobile device, information representing the quality of transmission, such as a measurement of RSSI, between the mobile device 30 and the antenna SK and, in the same timeslot allocated to the mobile device, information representing the quality of transmission, such as a measurement of RSSI, between the mobile device 30 and the antenna Sadj. The measurement of RSSI is made throughout the timeslot allocated to the mobile device 30 for transmitting data.

Adj represents the index of the antenna adjacent to the antenna SN. Thus the variable adj varies from 1 to N−1, the antenna SN being omnidirectional, the sector antennas are all adjacent to the omnidirectional antenna SN.

At the following step S1016, the processing module 100 awaits the start of a new timeslot allocated in reception to the mobile device.

At the step S1017, the processing module 100 checks whether all the adjacent antennas have been processed.

If so, the processing module 100 passes to the step S1018, if not the processing module passes to the step S1014 and selects another adjacent antenna that has not been processed.

At the step S1018, the processing module 100 checks whether the information representing the highest quality of transmission among the information representing the quality of transmission is above a predetermined threshold. This predetermined threshold is defined as minimum reception threshold.

If so, the processing module 100 passes to the step S1019. If not, the processing module 100 interrupts the present algorithm and returns to the step S800 of the algorithm of FIG. 8 in the acquisition mode.

At the step S1019, the processing module 100 selects the antenna for which the information representing the quality of transmission is the most important and, at the step S1012, allocates to the variable K the index of the selected antenna. This antenna is thus considered to be a reference antenna.

Once this operation has been performed, the processing module 100 returns to the step S1000.

Thus N−1 frames only are necessary in the pursuit mode when the selected antenna is an omnidirectional antenna.

It should be noted here that the processing module 100 takes into account the fact that the sectors covered by an antenna of the antenna system 11 is a lobe overlapping with lobes of adjacent antennas. In this case, the processing module 100 applies a hysteresis to avoid too many changes of antenna.

The invention claimed is:

1. The method for selecting an antenna in a system comprising a first device and at least one second mobile device, the system forming a communication network wherein the first device communicates the at least one second device using a media-access technique of the time division multiple access type wherein each communication takes place in frames, each frame being divided into a plurality of timeslots comprising a first timeslot enabling the first device to send a first signal to the second device and enabling the second device to synchronise timewise on a time reference of the first device, and a second timeslot enabling the second device to send a second signal in response to the first signal to acknowledge its presence in the system, the first device sending and receiving the signals by means of an antenna system comprising at least a number N of sector antennas with N greater than or equal to four and an omnidirectional antenna, wherein the method comprises the steps performed by the first device of:

obtaining, in an acquisition mode, for each antenna in the antenna system, a first item of information representing a quality of communication between the antenna and the second device;

selecting, from the obtained first items of information representing a communication quality, the antenna the first item of information of which representing the communication quality is the highest, to transmit and/or receive data with the mobile device, obtaining, in a pursuit mode, if the selected antenna is a sectoral antenna, for the unidirectional antenna and for each antenna in a group of M sectoral antennas comprising the selected sectoral antenna, with M strictly less than N, a second item of information representing a quality of communication between the antenna and the second device;

selecting, from the obtained second items of information representing a communication quality, the antenna the second item of information of which representing the communication quality is the highest, to transmit and/or receive data with the mobile device;

obtaining, in the pursuit mode, each antenna of the antenna system, a third item of information representing a quality of communication between the antenna and the second device if the selected antenna is the omnidirectional antenna; and selecting, from the obtained third items of information representing a communication quality, the antenna the third item of information of which representing the communication quality is the highest, to transmit and/or receive data with the mobile device.

2. The method according to claim 1, wherein the method further comprises the step performed by the first device for checking whether the first item of information representing the highest communication quality is below a predetermined threshold, and in that the first device remains in the acquisition mode as long as the first item of information representing the highest communication quality is below a predetermined threshold.

3. The method according to claim 1, wherein the method further comprises the step performed by the first checking device if the second or the third item of information representing the highest communication quality is below a predetermined threshold, and in that the first device goes into the acquisition mode if the second item of information representing the highest communication quality is below the predetermined threshold.

4. The method according to claim 1, wherein N is equal to six, M is equal to three and the group of antennas comprises the sector antennas adjacent to the sector antenna selected.

5. The method according to claim 1, wherein the first device comprises two reception channels and in that the omnidirectional antenna is connected alternately to one or other of the reception channels.

6. A device for selecting an antenna in a system comprising a first device and at least one second mobile device, the system forming a communication network wherein the first device communicates the at least one second device using a media-access technique of the time distribution multiple access type wherein each communication takes place in frames, each frame being divided into a plurality of timeslots comprising a first timeslot enabling the first device to send a first signal to the second device and enabling the second device to synchronise timewise on a time reference of the first device, and a second timeslot enabling the second device to send a second signal in response to the first signal to acknowledge its presence in the system, the first device sending and receiving the signals by means of an antenna system comprising at least a number N of sector antennas with N greater than or equal to four and an omnidirectional antenna, wherein the selection device is included in the first device and comprises:

means for obtaining, in an acquisition mode, for each antenna in the antenna system, a first item of information representing a quality of communication between the antenna and the second device;

means for selecting, from the obtained first items of information representing a communication quality, the antenna the first item of information of which representing the communication quality is the highest, to transmit and/or receive data with the mobile device, means for obtaining, in a pursuit mode, if the selected antenna is a sectoral antenna, for the omnidirectional antenna and for each antenna in a group of M sectoral antennas comprising the selected sectoral antenna, with M strictly less than N, a second item of information representing a quality of communication between the antenna and the second device;

means for selecting, from the obtained second items of information representing a communication quality, the antenna the second item of information of which representing the communication quality is the highest, to transmit and/or receive data with the mobile device;

means for obtaining, in the pursuit mode, for each antenna of the antenna system, a third item of information representing a quality of communication between the antenna and the second device if the selected antenna is the omnidirectional antenna;

means for selecting, from the obtained third items of information representing a communication quality, the antenna the third item of information of which representing the communication quality is the highest, to transmit and/or receive data with the mobile device.

7. A system for selecting an antenna comprising a first device and at least one second mobile device, the system forming a communication network wherein the first device communicates the at least one second device using a media-access technique of the time division multiple access type wherein each communication takes place in frames, each frame being divided into a plurality of timeslots comprising a first timeslot enabling the first device to send a first signal to the second device and enabling the second device to synchronise timewise on a time reference of the first device, and a second timeslot enabling the second device to send a second signal in response to the first signal to acknowledge its presence in the system, the first device sending and receiving the signals by means of an antenna system comprising at least a number N of sector antennas with N greater than or equal to four and an omnidirectional antenna, wherein the system comprises:

means, included in the first device, for obtaining, in an acquisition mode, for each antenna in the antenna system, a first item of information representing a quality of communication between the antenna and the second device;

means, included in the first device, for selecting, from the obtained first items of information representing a communication quality, the antenna the first item of information of which representing the communication quality is the highest, for transmitting and/or receiving data with the mobile device;

means, included in the first device, for obtaining, in a pursuit mode, if the selected antenna is a sector antenna, for the omnidirectional antenna and for each antenna in a group of M sector antennas comprising the selected sector antenna, with M strictly less than N, a second item of information representing a quality of communication between the antenna and the second device;

means, included in the first device, for selecting, from the obtained second items of information representing a communication quality, the antenna the second item of information of which representing the quality of communication is the highest, for transmitting and/or receiving data with the mobile device;

means, included in the first device, for obtaining, in the pursuit mode, for each antenna in the antenna system, a third item of information representing a quality of communication between the antenna and the second device if the selected antenna is the omnidirectional antenna;

means, included in the first device, for selecting, from the obtained third items of information representing a communication quality, the antenna the third item of information of which representing the quality of communication is the highest, for transmitting and/or receiving data with the mobile device;

two reception channels, included in the first device, the omnidirectional antenna being connected alternately to one or other of the reception channels; and two reception channels, included in the second device.

8. A non-transitory storage medium storing a computer program that comprises instructions for implementing, by a device, the method according to claim 1, when the program is executed by a processor of the device.

* * * * *